United States Patent [19]

Mehalchick et al.

[11] 4,145,224

[45] Mar. 20, 1979

[54] METHOD FOR ENHANCING THE CRYSTALLIZATION RATE OF HIGH PURITY AMORPHOUS $Si_3N_4$ POWDER, POWDERS PRODUCED THEREBY AND PRODUCTS THEREFROM

[75] Inventors: Emil J. Mehalchick; Richard N. Kleiner, both of Towanda, Pa.

[73] Assignee: GTE Sylvania Incorporated, Stamford, Conn.

[21] Appl. No.: 526,257

[22] Filed: Nov. 22, 1974

[51] Int. Cl.$^2$ .............................................. C04B 35/58
[52] U.S. Cl. .................................. 106/73.3; 106/73.5; 106/55; 423/344
[58] Field of Search ...................... 106/39.5, 55, 73.3; 423/266, 275, 344; 75/175.5

[56] References Cited

U.S. PATENT DOCUMENTS

| | | | |
|---|---|---|---|
| 2,618,565 | 11/1952 | Nicholson | 423/344 X |
| 3,110,589 | 11/1963 | Bechtold | 75/175.5 |
| 3,211,527 | 10/1965 | Forsyth | 423/344 |
| 3,253,886 | 5/1966 | Lamprey et al. | 423/344 X |
| 3,352,637 | 11/1967 | Heymer et al. | 423/344 X |

FOREIGN PATENT DOCUMENTS

| | | |
|---|---|---|
| 2003568 | 11/1969 | France. |
| 1028977 | 5/1966 | United Kingdom ..................... 423/344 |
| 1199811 | 7/1970 | United Kingdom. |

OTHER PUBLICATIONS

Mazdiyasni, K. S.–"Synthesis, Characterization, and Consolidation of $Si_3N_4$ Obtained from Ammonolysis of $SiCl_4$"–J AM Cer Soc 56 (12) (1973) pp. 628–633.

Crandall, W. B. et al., "Preparation and Evaluation of Si–Al–O–N" IIT Research Institute–Jun. 1973–Prepared for Aerospace Research Labs, USAFAD–A20-1–997, pp. 8–10, 39 and 42.

*Primary Examiner*—Helen McCarthy
*Attorney, Agent, or Firm*—John C. Fox

[57] ABSTRACT

High purity, fine $Si_3N_4$ powder produced by the vapor phase reaction of $SiCl_4$ with $NH_3$ is amorphous. The crystallization rate of the amorphous powder is enhanced by heating the powder while in intimate contact with a titanium containing material, for example, TiN codeposited with the $Si_3N_4$ by the simultaneous reaction of $TiCl_4$ with $NH_3$.

4 Claims, No Drawings

METHOD FOR ENHANCING THE CRYSTALLIZATION RATE OF HIGH PURITY AMORPHOUS SI$_3$N$_4$ POWDER, POWDERS PRODUCED THEREBY AND PRODUCTS THEREFROM

BACKGROUND OF THE INVENTION

This invention relates to a method for enhancing the crystallization rate of high purity amorphous Si$_3$N$_4$ powder, powders produced by such method, and products produced from such powders.

Si$_3$N$_4$ has generated considerable interest recently as a possible substitute for super alloys in applications requiring high strength at elevated temperatures and good resistance to thermal shock and corrosion, an outstanding example of which is turbine engine components. Optimization of the physical properties of this material, particularly high temperature strength and thermal shock resistance holds out the promise of significant increases in the operating temperatures and efficiencies of turbine engines over those possible with super alloy components. Such optimization is dependent upon the ability to produce bodies of high purity and high density.

However, highest densities are at present obtained by hot pressing powders containing significant amounts (several percent) of grain growth inhibitors. See, for example, Powder Metallurgy, 1961, No. 8, p. 145. Thus, achieving both high purity and high density would appear to depend upon the development of pure powders having significantly enhanced reactivity over those presently available.

Copending U.S. Patent application Ser. No. 436,432, filed Jan. 25, 1974, now abandoned, and assigned to the present assignee describes a technique for producing high purity fine grain Si$_3$N$_4$ powder, based upon the vapor phase reaction of a silicon halide compound with ammonia. This powder possesses a purity of at least 99.9 percent, an average grain size below 1.0 microns and an adsorbed oxygen content typically less than 4 percent by weight which may be subsequently reduced to less than 1 percent by heating the powder in dry nitrogen or other non-reactive atmosphere. In addition, the powder is characterized as being in the amorphous state, and is often at least partly crystallized by heating in a non-reactive atmosphere at a temperature within the range of about 1500° C. to 1600° C. for several hours in order to enhance the formation of the alpha polymorph of silicon nitride. The crystallized material is then consolidated and formed into dense polycrystalline bodies by conventional means such as mixing with appropriate binders, presintering and either cold pressing to compacts, followed by sintering the compacts to achieve densification, or hot pressing in the conventional manner.

It would be particularly advantageous in the commercial production of such crystallized powders if the crystallization rate could be increased, thereby enabling shorter heat treatment times or lower heat treatment temperatures or both, and use of less refractory or less chemically inert containers.

SUMMARY OF THE INVENTION

In accordance with the invention, it has been discovered that the crystallization rate of high purity fine grain amorphous Si$_3$N$_4$ powder may be enhanced by heating such powder while in intimate contact with a titanium containing material. As little as 0.01 weight percent titanium in a powder mixture enables crystallization of the amorphous Si$_3$N$_4$ powder at temperatures as low as 1400° C. Such intimate contact may be achieved in one embodiment by coprecipitating titanium nitride with the Si$_3$N$_4$ from the vapor phase. The crystallization is then carried out during a subsequent heat treating step. In accordance with an alternate embodiment, such intimate contact may be achieved by carrying out the crystallization heat treatment in a container of an inert refractory material together with sufficient titanium to achieve diffusion therefrom into the Si$_3$N$_4$ powder in the amount of at least 0.01 weight percent.

The Si$_3$N$_4$ powders are useful in the formation of shaped bodies by either cold pressing, casting, extrusion or other forming techniques followed by sintering to densify the cold formed compact, or by hot forming, e.g., hot pressing to directly form a densified body.

Polycrystalline bodies exhibiting densities of 60 percent of theoretical density or more are possible using these powders.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The method of forming the silicon nitride powder by vapor phase reaction is described in detail in copending patent application Ser. No. 436,432, filed Jan. 25, 1974, and assigned to the present assignee, and is thus not a necessary part of this description. However, to aid the practitioner, a brief summary of that technique is as follows.

The reactants, SiCl$_4$ and NH$_3$ of the desired purity (at least 99.9 percent) are introduced into the reaction apparatus at a point where the temperature is at least 1100° C. The temperature of the reaction zone should be maintained between 1100° C. and 1350° C.

A suitable diluent gas, provided it is of the requisite purity and is non-reactive, may be present in the reaction chamber. The gas pressure in the reaction zone should be at least atmospheric in order for the product to be produced in particulate form. Typical diluent gases include nitrogen, argon and helium. Since the finely divided product is susceptible to oxidation, the diluent gas or other inert atmosphere or vacuum should be maintained in contact with the product until it is cooled to below at least 100° C.

The mole ratio of NH$_3$ to SiCl$_4$ should preferably be maintained within the range of 1.25 to 15.

The NH$_4$Cl by-product may be removed from the product in a separate step by heating in a non-oxidizing atmosphere or vacuum above about 340° C., the sublimation temperature of NH$_4$Cl.

Some oxygen, typically less than about 4 weight percent of the product may also be adsorbed on the powder, and may be reduced to less than about 1 percent by heating the powder in dry nitrogen or other non-reactive atmosphere.

The silicon nitride (Si$_3$N$_4$) powder product obtained by the above method is characterized by an amorphous structure. Crystallization of this structure may be achieved by heating the powder in a refractory non-reactive container at a temperature of from 1500° C. to 1600° C. for several hours, for example, from 3 to 8 hours. In accordance with the invention, it has been discovered that carrying out this crystallization heat treatment while the powder is in intimate contact with a titanium-containing material enhances the rate of crystallization of the $Si_3N_4$ powder. The amount of titanium containing material is not critical, as little as 0.01 weight having been observed to permit substantial crystallization of the powder at temperatures as low as 1400° C. Larger amounts can be used, and the upper limit will be dictated by the point at which desired enhancement of crystallization rate is offset by the decreased purity of the $Si_3N_4$ product. Based upon these considerations, it is preferred to maintain the titanium in the amount of from about one half to five weight percent of the powder.

A preferred method of achieving the intimate contact of the titanium containing material with the $Si_3N_4$ powder is to codeposit TiN with the $Si_3N_4$ in accordance with the technique described above. While $TiCl_4$ is completely miscible with $SiCl_4$, the volume ratio of $SiCl_4$ to $TiCl_4$ must be about 10 to 12 times more than that which would correspond to the desired weight ratio of $Si_3N_4$ to TiN in the final product due to the fact that vapor pressures and molecular weights of $SiCl_4$ and $TiCl_4$ are different.

In the following example a homogenous mixture of $Si_3N_4$ and TiN was prepared by codeposition from the vapor phase as described above and subsequently given a crystallization heat treatment.

EXAMPLE I

An amorphous $Si_3N_4$ powder containing about 3 weight percent TiN and codeposited from the vapor phase reaction with $NH_3$, is heated at about 1400° C. in dry $N_2$ for about 2 hours. The product is identified by x-ray diffraction as about 60 weight percent crystalline, about 97 weight percent of which is the $\alpha$ polymorph and about 3% is the $\beta$ polymorph, and a trace amount of TiN.

A pure amorphous $Si_3N_4$ powder containing no TiN and deposited as above, is heated at about 1400° C. in dry $N_2$ for about 2 hours. X-ray analysis reveals no crystalline phases present.

As may be seen from the above example, the presence of TiN resulted in crystallization of the $Si_3N_4$ powder at a significantly lower temperature than the 1500° C. to 1600° C. required without the presence of TiN.

In accordance with a second embodiment of the method of the invention, the intimate contact between the titanium containing material and $Si_3N_4$ powder may be achieved during the crystallization heat treatment by carrying out such heat treatment in a refractory inert vessel of a material containing sufficient titanium in a diffusable state to result in the leaching and diffusion of titanium from the walls of the container into the $Si_3N_4$ powder. The following two examples illustrate the effectiveness of such a technique by comparing crystallization heat treatments carried out in a tungsten crucible containing no titanium and in a molybdenum crucible containing titanium as an alloy component in the amount of 0.01 to 0.05 weight percent.

EXAMPLE II

The pure amorphous $Si_3N_4$ powder of Example I is heated in a tungsten crucible containing no TiN under dry $N_2$ at about 1500° C. for about 4 hours. X-ray analysis reveals that about 5 to 10 percent crystalline material is present.

EXAMPLE III

The pure amorphous $Si_3N_4$ powder of Example I is heated in a molybdenum crucible containing about 0.03 ± 0.02 weight percent titanium under dry $N_2$ at about 1450° C. for about 2 hours. X-ray analysis reveals that about 60 percent crystalline material is present.

As may be seen from the above examples carrying out the crystallization heat treatment in the presence of a titanium containing material significantly lowers the temperature at which crystallization may be carried out.

While there has been shown and described what are at present considered the preferred embodiments of the invention, it will be obvious to those skilled in the art that various changes and modifications may be made therein without departing from the scope of the invention as defined by the appended claims.

What is claimed is:

1. $Si_3N_4$ powder having particles up to 1.0 microns in size, having a purity of at least 99.9 percent, and characterized by additionally containing at least 0.01 weight percent titanium.

2. The powder of claim 1 wherein titanium is present in the amount of from about one half to five weight percent.

3. A polycrystalline body consisting essentially of $Si_3N_4$ having a purity of at least 99.9 percent and a density of at least 60 percent of theoretical density, characterized in that said polycrystalline body additionally contains at least 0.01 weight percent titanium.

4. Polycrystalline body of claim 3 characterized by the presence of titanium in the amount of from about one half to five weight percent.

* * * * *